J. W. PARK.
Bee-Hive.
No. 200,931. Patented March 5, 1878.
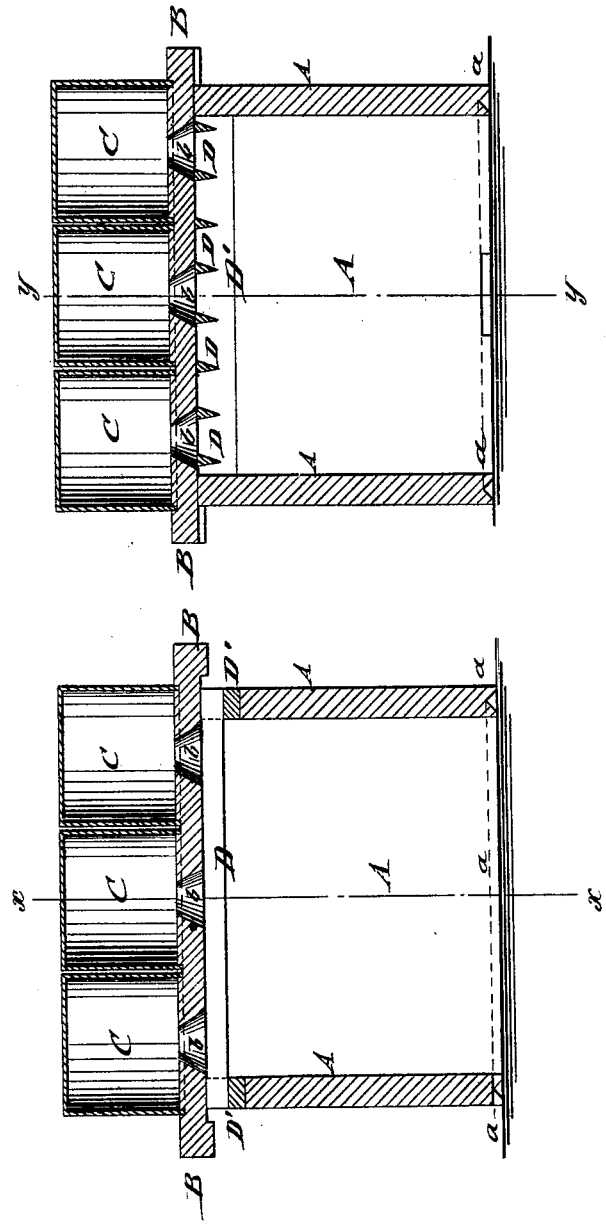

UNITED STATES PATENT OFFICE.

JESSE W. PARK, OF COLUMBIA, TEXAS.

IMPROVEMENT IN BEE-HIVES.

Specification forming part of Letters Patent No. 200,931, dated March 5, 1878; application filed October 6, 1877.

*To all whom it may concern:*

Be it known that I, JESSE W. PARK, of Columbia, in the county of Brazoria and State of Texas, have invented a new and Improved Bee-Hive, of which the following is a specification:

In the accompanying drawings, Figures 1 and 2 are vertical central sections through my improved bee-hive, taken at right angles to each other, respectively on lines $y\ y$, Fig. 2, and $x\ x$, Fig. 1.

Similar letters of reference indicate corresponding parts.

This invention is intended to furnish for apiarians an improved bee-hive, by which the entrance of moths or insects into the bee-hive is prevented, the surplus honey readily removed without any loss by drippage, and the attaching of the brood-combs and the connection of the brood-section with the surplus-honey receptacles facilitated.

The invention consists of a bee-hive having a lower brood-department with bottom groove filled with bar-soap for preventing entrance of moths. A number of comb-strips are fitted in and supported upon notched strips, which are placed upon the upper edge of the brood-chamber section of the hive, as hereinafter described.

Referring to the drawings, A represents the lower section or brood-department of my improved bee-hive; B, the top of the hive, and C the receptacle or boxes for the surplus honey.

The brood-section A has a bottom groove, $a$, that is filled with bar-soap for killing the moths and other insects, which is assisted by sprinkling water occasionally on the sides of the hive. Below the top B are the comb-strips D, which are of triangular shape, tapering downwardly and resting on notched side strips $D'$ of the brood-section A. The comb-strips serve for the bees to build their brood-combs on. The pieces $D'$ are made separate from the body of the hive, but attached thereto by nails, screws, or other means.

By unscrewing and removing the cover B, the guide-strips D and their attached sections of brood-comb are made accessible, and each, a part, or all of the strips may be detached and removed to another hive. To do this it is only necessary to cut or separate (by means of a long knife) the ends of the comb-sections from the body of the hive, which being done, the strips $D'$ and the comb-sections attached thereto may be lifted out of the brood-chamber and placed in another hive of similar construction. In practice I usually transfer four sections of the comb with strips, leaving four in the old hive. I then replace the top B on the body of the hive. The operation of swarming will then be completed, and the surplus bees lodged in the new hive, in which they will immediately go to work.

Holes $b$ are formed in the top B, over the spaces between the strips D, for passage of bees between the brood-chamber and surplus-honey boxes.

The boxes may be made cylindrical or of other shape, of tin or other material, closed at the top and open at the bottom, and set on top of hive.

The boxes are waxed on the inside, and placed each over a communicating hole, $b$, with the open part downward. When full they are taken off and replaced by empty boxes.

The use of the honey-buckets facilitates the handling of the honey, saves the drip, and furnishes the honey in good shape for shipment.

The boxes are closed by lids fitting thereon, so as to store thereby the honey in direct and convenient manner.

Having thus described my invention, I claim as new and desire to secure by Letters Patent—

1. As an improvement in hives in which the honey-box compartment is supported upon and separate from the brood-chamber, the removable notched strips placed upon the upper edges of the brood-chamber inclosure and the comb-strips fitted therein, as described.

2. The lower section or brood-compartment, having bottom groove to be filled with soap for killing the insects, substantially as set forth.

JESSE WAREN PARK.

Witnesses:
J. P. UNDERWOOD,
C. S. HEALY.